United States Patent
Kitamura

[11] Patent Number: 6,057,657
[45] Date of Patent: May 2, 2000

[54] MAGNETICALLY OPERATED BICYCLE ANTITHEFT DEVICE

[75] Inventor: Satoshi Kitamura, Kita-Katsuragi, Japan

[73] Assignee: Shimano, Inc., Osaka, Japan

[21] Appl. No.: 09/322,904

[22] Filed: Jun. 1, 1999

Related U.S. Application Data

[63] Continuation-in-part of application No. 09/109,450, Jul. 2, 1998, Pat. No. 5,945,794.

[51] Int. Cl.[7] .............................. B62H 5/08; E05B 71/00; B62M 25/00
[52] U.S. Cl. ................................ 318/16; 70/233; 318/520
[58] Field of Search ............................. 318/1, 2, 16, 139, 318/519, 520; 70/233, 236; 180/218, 219, 220; 370/425.5, 426, 427, 432

[56] References Cited

U.S. PATENT DOCUMENTS

| | | | |
|---|---|---|---|
| 4,276,540 | 6/1981 | Habib, Jr. ................................. | 340/427 |
| 5,008,647 | 4/1991 | Brunt et al. .............................. | 340/432 |
| 5,637,984 | 6/1997 | Chu ............................................ | 322/8 |
| 5,783,996 | 7/1998 | Muszynski .............................. | 340/571 |

OTHER PUBLICATIONS

Temic Semiconductors product literature, model U2270B Read/Write Base Station IC; published Dec. 13, 1996, Germany.

Temic Semiconductors product literature, model e5550 Standard R/W Identification IC; published Feb. 17, 1995, Germany.

*Primary Examiner*—Bentsu Ro
*Attorney, Agent, or Firm*—James A. Deland

[57] ABSTRACT

An antitheft control apparatus for a bicycle includes a key and an antitheft control circuit. The key includes a key base, an enabling signal transmitter supported to the key base for transmitting a wireless enabling signal, a power signal receiver for receiving an external wireless power signal and a command signal transmitter supported to the key base for transmitting a wireless command signal, wherein the command signal transmitter is powered by the power signals received by the power signal receiver. The antitheft control circuit includes a lock control circuit for providing a lock control signal for at least one of locking and unlocking a bicycle antitheft device, a switch for selectively enabling the lock control circuit to provide the lock control signal, and a sensor for sensing the wireless enabling signal transmitted by the key. The switch is operatively coupled to the sensor for enabling the lock control circuit, in response to the enabling signal, to provide the lock control signal. The lock control circuit includes a power signal transmitter for transmitting the wireless power signal to the key and a command receiving circuit for receiving the wireless command signal transmitted by the key for commanding the lock control circuit to provide the lock control signal.

20 Claims, 11 Drawing Sheets

MAGNETICALLY OPERATED BICYCLE ANTITHEFT DEVICE

CROSS REFERENCE TO RELATED APPLICATION

This application is a continuation-in-part of allowed application Ser. No. 09/109,450 entitled "Power Saving Antitheft Control Device for a Bicycle" and filed on Jul. 2, 1998, now U.S. Pat. No. 5,945,794.

BACKGROUND OF THE INVENTION

The present invention is directed to control devices for bicycle antitheft devices and, more particularly, to a magnetically operated bicycle antitheft device that does not require a battery in the key.

Bicycles, particularly recreational bicycles referred to as city cruisers, are inexpensive and are easy to ride, so they are widely used to commute to work or to school. Such recreational bicycles are sometimes stolen from bike stands or the like in front of train stations. To prevent this type of theft, bicycle locks such as box-shaped locks and horseshoe-shaped locks are attached to the front or back fork to lock the wheel. However, the simple structure of bicycle locks makes them easy to unlock or break and remove.

Antitheft devices which mount to the bicycle wheel hub and which make the bicycle difficult to ride also have been developed recently. The lock mechanism of such antitheft devices usually is disposed inside an internal shifting hub. When the lock mechanism is activated, the rear wheel of the bicycle is difficult to move, and noise is emitted when forcible movement is attempted. The lock mechanism can be operated between a locked state and an unlocked state with the aid of a shift control element provided to a handlebar.

More elaborate bicycle antitheft devices use electronic circuits to control a lock. For example, JP 8-260784 shows an antitheft device that may be operated either manually using a key or electronically using a transmitter. Antitheft control devices that operate electronically are often also used in automobiles and are very convenient because the user can operate the antitheft control device by merely pressing a button on a key or key holder to transmit a lock or unlock command signal to the antitheft control device. The antitheft control device then locks or unlocks the antitheft device (e.g., the locks on the automobile door) in response to the command signal In order to receive the lock or unlock command signal at any time, the command signal receiver in conventional antitheft control devices must be powered at all times. This does not pose a problem with automobiles because automobiles use rather large batteries that are regularly recharged during operation of the automobile. However, such batteries are not used on bicycles because of the size and weight of the batteries. Electronic devices used with bicycles, such as bicycle computers and automatic transmission devices, must use small batteries that are as lightweight as possible. Such batteries are usually not rechargeable. Thus, a conventional antitheft control device would not be practical because a constantly powered signal receiver would quickly discharge the battery.

The applicant recently has developed a remote-controlled bicycle antitheft device wherein the command signal receiver is powered by a magnetically controlled switch which is closed for supplying power to the command signal receiver only when a magnetic key is placed in close proximity to the magnetic switch. The key also includes a battery-operated command signal transmitter which transmits a locking or unlocking command to the command signal receiver whenever a button on the key is pressed. While such a system solves the problems noted above, it would be even better if the key did not require its own battery.

SUMMARY OF THE INVENTION

The present invention is directed to a bicycle antitheft control device that does not require a battery in the key. In one embodiment of the present invention, an antitheft control circuit for a bicycle includes a lock control circuit for providing a lock control signal for at least one of locking and unlocking a bicycle antitheft device, a switch for selectively enabling the lock control circuit to provide the lock control signal, a sensor for sensing an externally transmitted enabling signal, and a command receiving circuit for receiving a command signal for commanding the lock control circuit to provide the lock control signal. The switch is operatively coupled to the sensor for enabling the lock control circuit, in response to the enabling signal, to provide the lock control signal. The switch may be disposed between the lock control circuit and a power source such as a small and lightweight battery for providing power to the lock control circuit in response to the enabling signal. Since power is supplied to the lock control circuit in response to the enabling signal, the antitheft control device may be in an off state until the enabling signal is received. Thereafter, the command receiving circuit may receive the lock command signal, and the antitheft control circuit can process the command and issue the appropriate lock control signal for locking or unlocking the antitheft device.

The key used to operate the antitheft control device includes a magnet for transmitting the enabling signal and a wireless command signal transmitter for transmitting the command signal. The magnetic enabling signal is provided to the sensor when the key is placed in close proximity to the sensor. The magnetic signal activates the switch which, in turn, powers the lock control circuit. The wireless command signal transmitter is powered by signals received externally of the key. For example, once the lock control circuit is activated by closing the magnetic switch, the lock control circuit may induce an electromagnetic field in a coil which is sensed by a coil located in the key. The sensed electromagnetic field is then used to power the command signal transmitter. The command signal transmitter on the key then may be activated to send the appropriate lock/unlock signal to the lock control circuit for selectively locking and/or unlocking the antitheft control device.

In a bicycle antitheft system that incorporates the present invention, an antitheft device is disposed in a bicycle hub so as to inhibit rotation of the hub when the antitheft device is in the antitheft position. If the hub is an internal transmission hub, then the antitheft device may be operated using the shift control device, and the switch, sensor and command receiving circuit may be disposed in the housing for the shift control device.

DETAILED DESCRIPTION OF THE EMBODIMENTS

Figure 1:
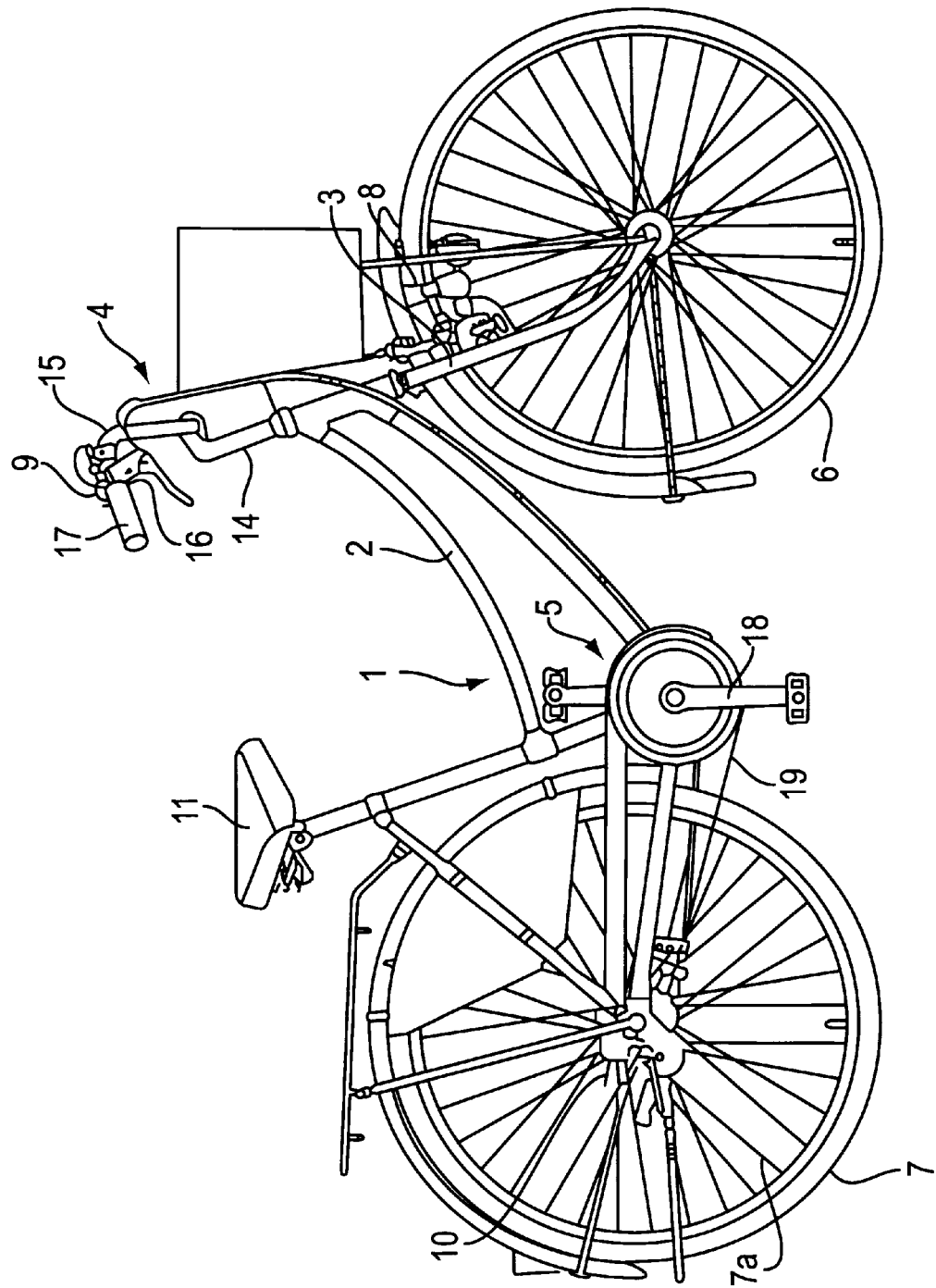
FIG. 1 is a side view of a particular embodiment of a bicycle that includes a magnetically operated antitheft device according to the present invention.
Figure 2:
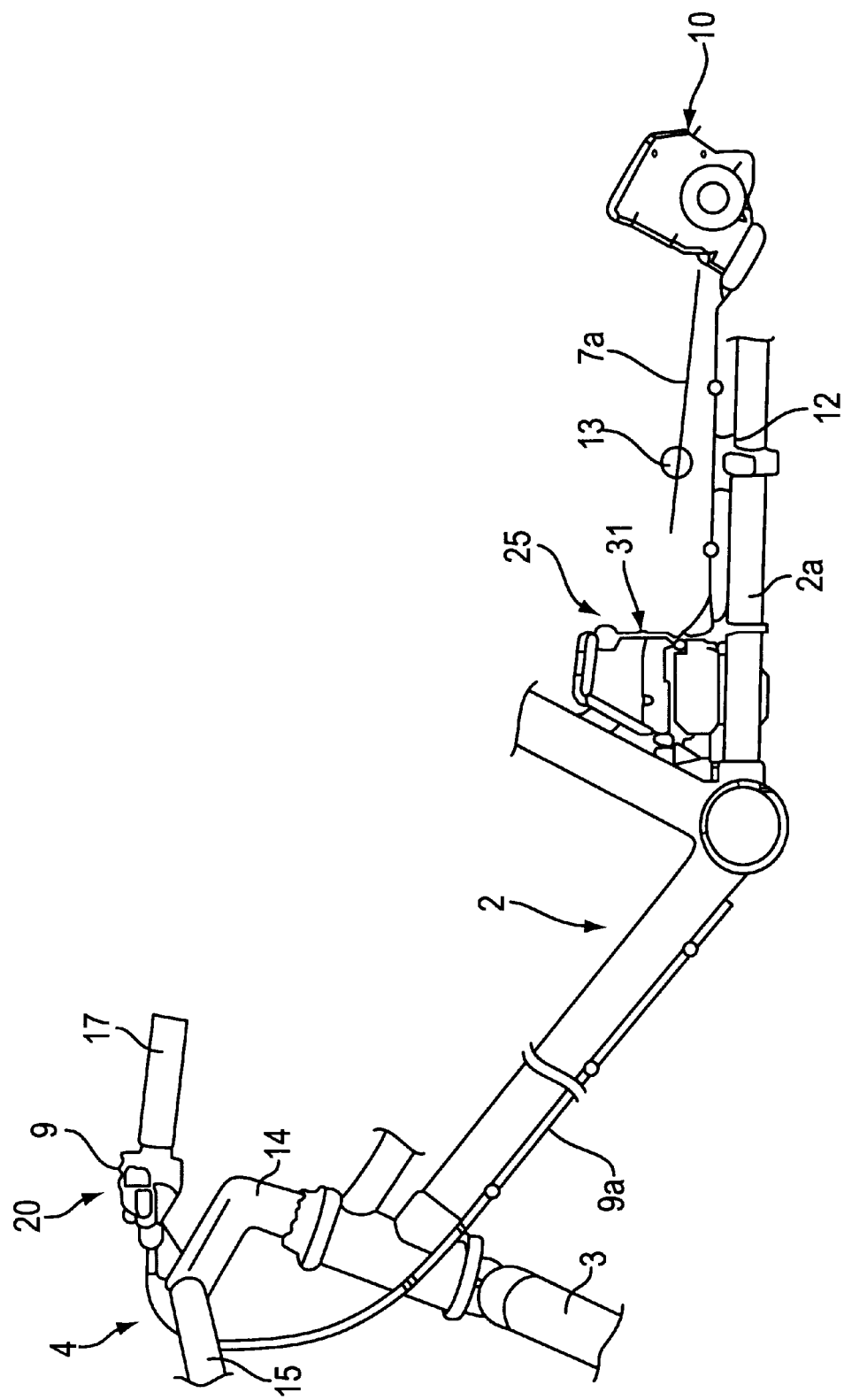
FIG. 2 is a fragmentary side view of a portion of the bicycle shown in FIG. 1 illustrating the major external components of the magnetically operated antitheft device according to the present invention.

FIG. 1 is a side view of a particular embodiment of a bicycle that includes an antitheft system that incorporates a magnetically operated antitheft control device according to the present invention, and FIG. 2 is a fragmentary side view of a portion of the bicycle shown in FIG. 1 illustrating the major external components of the magnetically operated antitheft device according to the present invention. The bicycle includes a frame 1 with a double loop type of frame unit 2 and a front fork 3; a handle component 4; a saddle 11; a drive component 5; a front wheel 6; a rear wheel 7 in which a four-speed internal gear shifter 10 is mounted; front and rear brake devices 8 (only front one shown in figure); and a shift control element 9 for conveniently operating the internal gear shifter 10. The handle component 4 has a handle stem 14 that is fixed to the upper portion of the front fork 3 and a handle bar 15 that is fixed to the handle stem 14. Brake levers 16 and grips 17 which constitute part of the brake devices 8 are mounted at either end of the handle bar 15. A control panel 20 for a shift control element 9 is mounted on the right-side brake lever 16. The drive component 5 has a gear crank 18 that is provided to the lower portion (bottom bracket portion) of the frame body 2, a chain 19 that is wrapped around the gear crank 18, and the internal gear shifter 10. As shown in FIG. 2, a bicycle speed sensor 12 furnished with a bicycle speed sensing lead switch is mounted on the chain stay 2a of the frame unit 2. This bicycle speed sensor 12 outputs a bicycle speed signal by detecting a magnet 13 mounted on a spoke 7a of the rear wheel 7.

Figure 3:
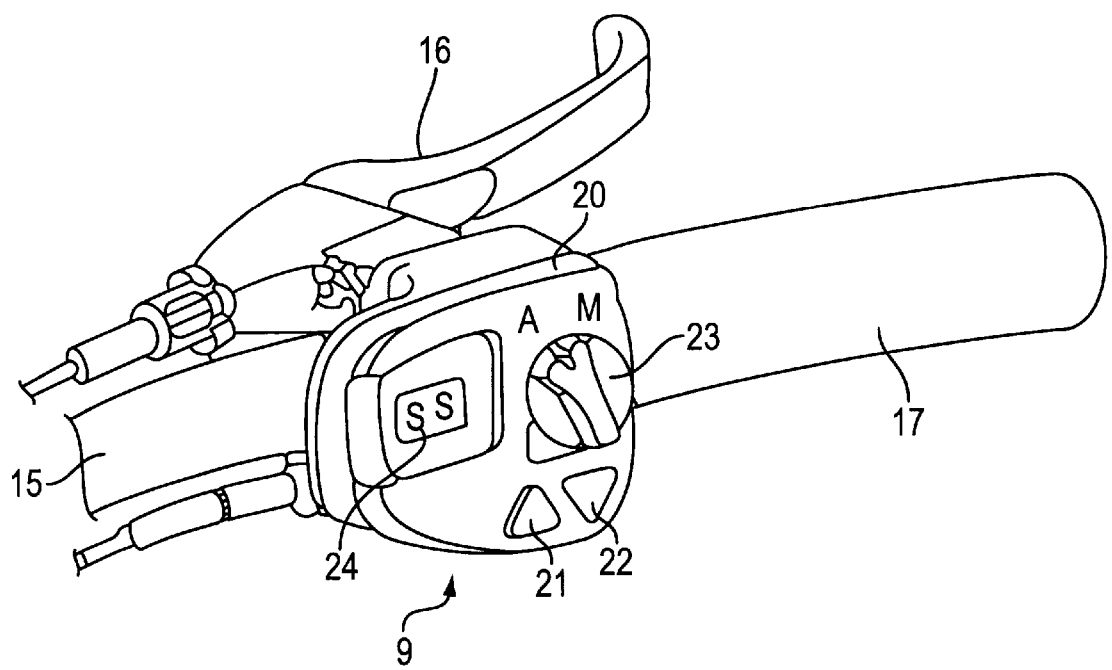
FIG. 3 is an oblique view of a portion of the handlebar of the bicycle shown in FIG. 1.
Figure 4:
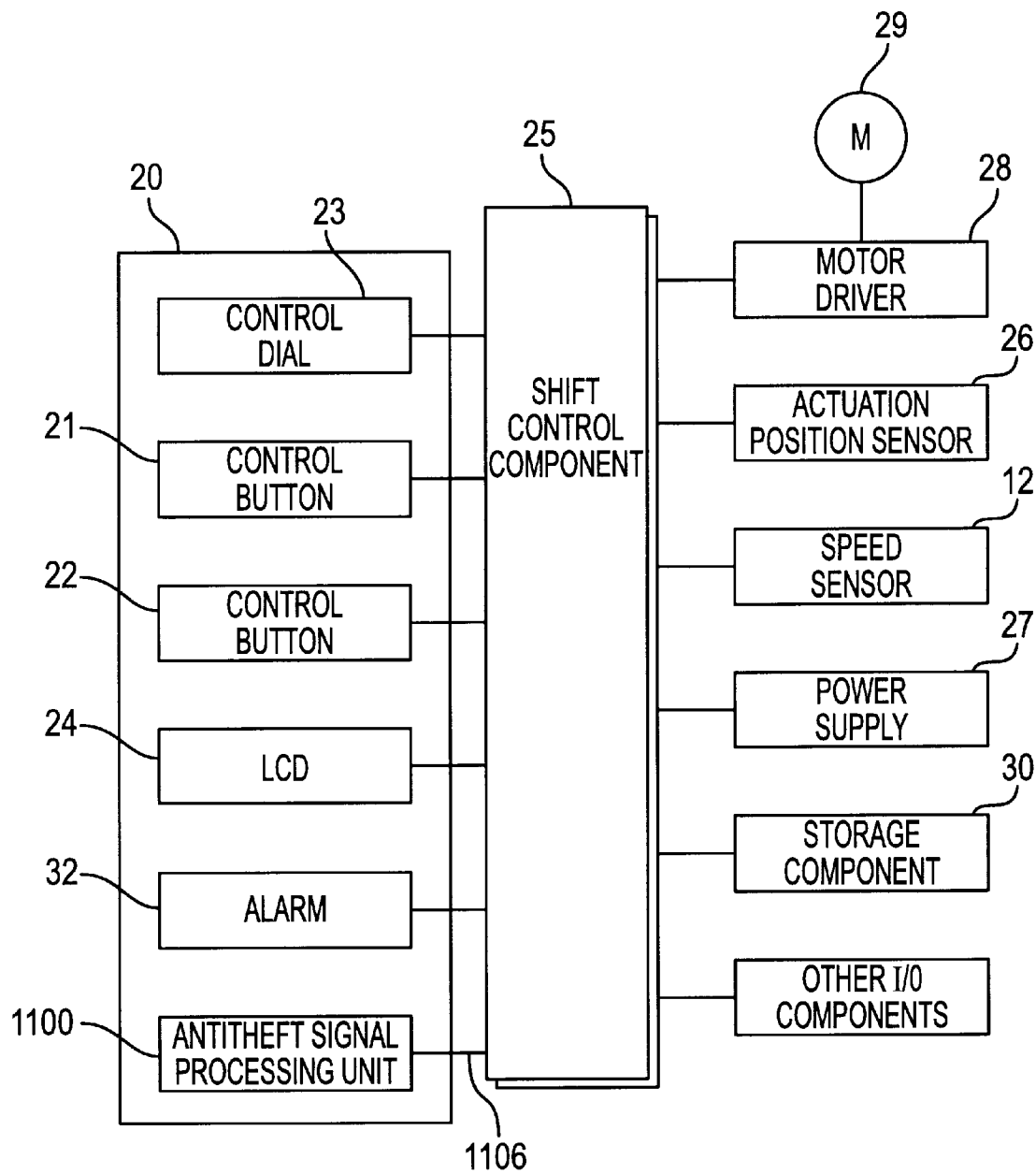
FIG. 4 is a schematic block diagram of a particular embodiment of a bicycle shift control device according to the present invention.

As shown in FIGS. 3 and 4, the shift control element 9 has two control buttons 21 and 22 disposed next to each other to the left and right on the lower portion of the control panel 20, a control dial 23 disposed above the control buttons 21 and 22, a liquid crystal display component 24 disposed to the left of the control dial 23, and an alarm 32 consisting of an internally disposed buzzer. Current riding speed is displayed by the liquid crystal display component 24, as is the speed step selected at the time of the shift. The shift control element 9 also has a shift control component 25, which is housed in a control box 31 (FIG. 2) mounted on the base end portion of the chain stay 2a. The components inside the control panel 20 are connected to the shift control component 25 via a control cable 9a.

The control buttons 21 and 22 are triangular push buttons. The control button 21 on the left side is used to perform shifts to a higher speed step from a lower speed step, while the control button 22 on the right side is used to perform shifts to a lower speed step from a higher speed step.

The control dial 23 is used to switch between two shift modes, and it has two stationary positions: automatic (A) and manual (M). The automatic mode (A) is a mode for automatically shifting the internal gear shifter 10 by means of a bicycle speed signal from the bicycle speed sensor 12. The manual shift mode (M) is a mode for shifting the internal gear shifter 10 through the operation of the control buttons 21 and 22. These specific modes do not form a part of the present invention and may be carried out in accordance with the teachings of U.S. patent application Ser. No. 09/047,763 filed Mar. 24, 1998 entitled "Motor Control Device for a Bicycle" and incorporated herein by reference. Another mode, selected by the magnetically operated antitheft control device described below, is a parking mode (P) for locking the internal gear shifter 10 and for inhibiting the rotation of the rear wheel 7.

The shift control component 25 comprises a microcomputer including a CPU, a RAM, a ROM, and an I/O interface. As shown in FIG. 4, the shift control component 25 is connected to the control dial 23 (provided to the control panel 20), the control buttons 21 and 22, the liquid crystal display component 24, and the alarm 32. The following components are also connected to the shift control component 25: the bicycle speed sensor 12; an actuation position sensor 26 disposed inside the internal gear shifter 10 and composed, for example, of a potentiometer that senses the actuation position thereof; a power supply 27 (consisting of a battery housed in the control box 31), a motor driver 28, a storage component 30, an antitheft control circuit 1100 and other I/O components. A shift motor 29 is connected to the motor driver 28.

The storage component 30 may comprise an EEPROM or another type of rewritable nonvolatile memory, and it is used to store various types of designated data such as wheel diameter data concerning the wheel diameter for use during speed detection, speed unit data for setting the units in which speed is displayed (kilometers or miles), speed group data for setting the speed or the like of the upshift or downshift in an automatic shift mode, shift position data for setting the shift position of the shift motor 29 when the motor 29 has been mounted in the internal gear shifter 10, and so on. The shift control component 25 controls the motor 29 in accordance with each mode and controls the display of the liquid crystal display component 24.

Figure 5:
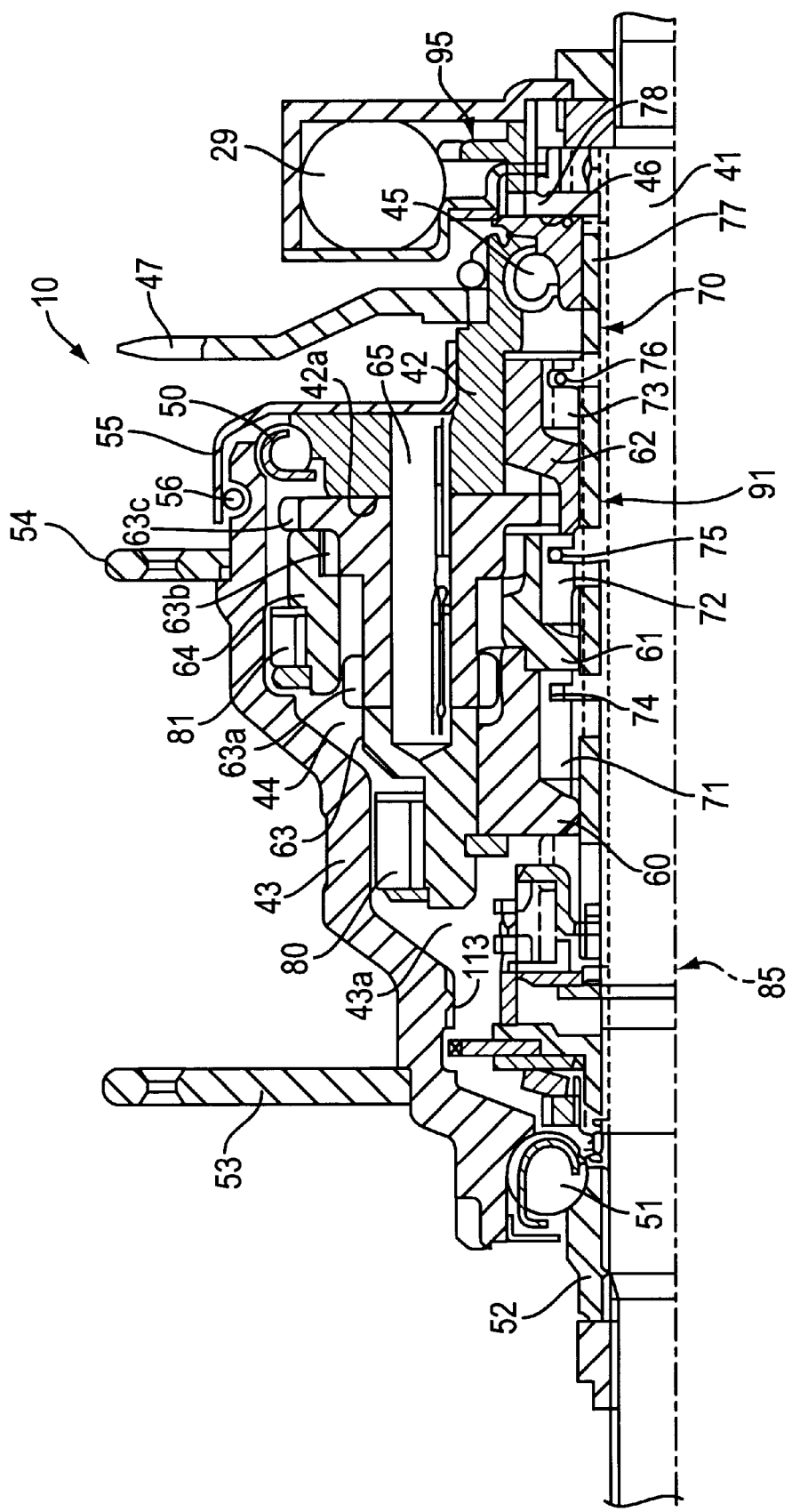
FIG. 5 is a cross sectional diagram of a particular embodiment of an internal hub transmission that includes an antitheft device according to the present invention.

As shown in FIG. 5, the internal gear shifter 10 primarily has a hub axle 41 that is fixed to the rear portion of the bicycle frame 1, a driver 42 that is located around the outer periphery at one end of the hub axle 41, a hub shell 43 that is located around the outer periphery of the hub axle 41 and driver 42, a planet gear mechanism 44 for transmitting motive force between the driver 42 and the hub shell 43, and an antitheft device 85. The planet gear mechanism 44 provides four power transmission steps, one direct and three speed-increasing.

The driver 42 is a roughly cylindrical member, one end of which is rotatably supported by the hub axle 41 via balls 45 and a hub cone 46. A hub cog 47 is fixed as an input element around the outer periphery at one end. A notch 42a that expands outward in the radial direction from the space in the center is formed in the driver 42. Three of these notches 42a are formed at equiangular intervals in the circumferential direction.

The hub shell 43 is a cylindrical member having a plurality of steps in the axial direction, and the driver 42 is housed in a housing space 43a around the inner periphery thereof. One side of the hub shell 43 is rotatably supported around the outer periphery of the driver 42 via balls 50, and the other by the hub axle 41 via balls 51 and a hub cone 52. Flanges 53 and 54 for supporting the spokes 7a (FIG. 1) of the rear wheel 7 are fixed around the outer periphery at both ends of the hub shell 43. A cover 55 is fixed to the outer lateral wall at one side of the driver 42, and the distal end of the cover 55 extends so as to cover the outer peripheral surface at one end of the hub shell 43. A sealing member 56 is positioned between the inner peripheral surface at the distal end of the cover 55, and the outer peripheral surface of the hub shell 43.

The planet gear mechanism 44 is housed in the housing space 43a inside the hub shell 43, and it has first, second, and third sun gears 60, 61, and 62; three planet gears 63 (only one planet gear is shown in the figures) that mesh with these; and a ring gear 64. The sun gears 60 to 62 are lined up in the axial direction around the inner periphery of the driver 42 and the outer periphery of the hub axle 41, and furthermore are rotatably supported relative to the hub axle 41. The planet gears 63 are rotatably supported via a support pin 65 within the notches 42a in the driver 42. A first gear 63a, a second gear 63b, and a third gear 63c are formed integrally with the planet gears 63. The first gear 63a meshes with the first sun gear 60, the second gear 63b meshes with the second sun gear 61, and the third gear 63c meshes with the third sun gear 62. The ring gear 64 is located on the outer peripheral side of the planet gears 63, and inner teeth are formed around the inner periphery. This ring gear 64 meshes with the second gear 63b of the planet gears 63.

Figure 6:
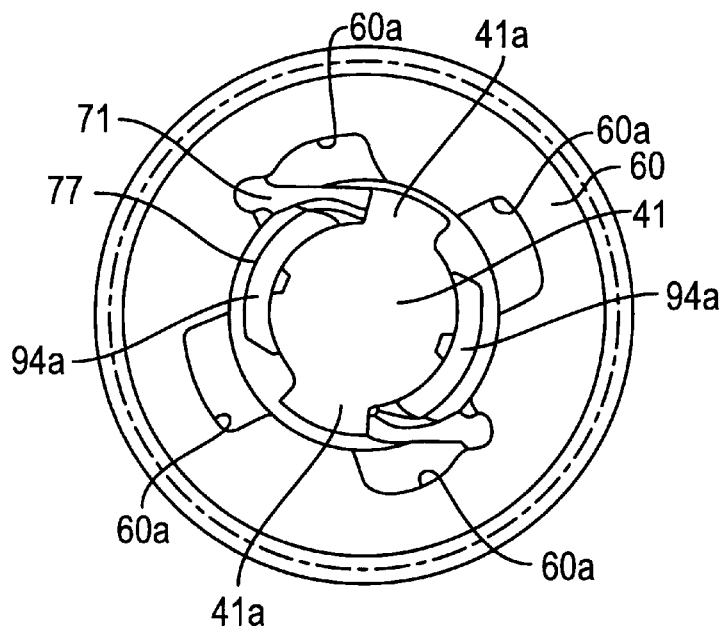
FIG. 6 is a diagram showing the relation between a sun gear and pawls used to lock the sun gear to the hub axle.

As shown in FIG. 6, a pair of stopping protrusions 41a are formed around the outside of the hub axle 41 at locations where the sun gears 60 to 62 are disposed (only the sun gear 60 is shown in FIG. 6). Four spaces 60a to 62a are formed apart from each other in the peripheral direction around the inner periphery of the sun gears 60 to 62. As shown in FIG. 5, the following components are positioned between the hub axle 41 and the inner periphery of the sun gears 60 to 62: a selective clutch mechanism 70 for preventing the sun gears 60 to 62 from performing relative rotation in the forward direction or for allowing them to rotate relative to the hub axle 41, and an actuation mechanism 91 for actuating the selective clutch mechanism 70.

The selective clutch mechanism 70 has a function whereby it selectively links one of the three sun gears 60 to 62 to the hub axle 41, and a function whereby it does not link any of the sun gears 60 to 62 to the hub axle 41. The selective clutch mechanism 70 has a plurality of drive pawls 71, 72, and 73 whose distal ends are able to mesh with the stopping protrusions 41a of the hub axle 41, and annular wire springs 74, 75, and 76 for energizing the distal ends of the drive pawls 71 to 73 toward the hub axle 41. The drive pawls 71 to 73 are disposed in two mutually facing spaces out of the four spaces 60a to 62a of the sun gears 60 to 62, are swingably supported at their base ends in the mutually facing pawl housing spaces 60a to 62a, and are able to mesh at their distal ends with the stopping protrusions 41a. When the drive pawls 71 to 73 are stopped by the stopping protrusions 41 a of the hub axle 41 and thereby linked to the hub axle 41, the sun gears 60 to 62 are no longer able to perform relative rotation in the forward direction (clockwise in FIG. 6) with respect to the hub axle 41, but they are able to perform relative rotation in the opposite direction (counterclockwise in FIG. 6). When the drive pawls are released, relative rotation is possible in both directions.

The actuation mechanism 91 has a sleeve 77 rotatably fitted over the outer periphery of the hub axle 41. Sleeve 77 has a plurality of drive cam components 94a at locations where the drive pawls 71 to 73 are disposed on the outer periphery. When these drive cam components 94a strike any of the drive pawls 71 to 73, the struck pawls are raised, and the linkage between the hub axle 41 and the sun gears 60 to 62 is released by these pawls. An operating component 78 is linked to one end of the sleeve 77, and the sleeve 77 can be rotated by the rotation of the operating component 78. The rotation of the sleeve 77 then causes the drive cam components 94a to selectively actuate the drive pawls 71 to 73, so that the linkage of the sun gears 60 to 62 with the hub axle 41 is controlled.

As shown in FIG. 5, a reduction mechanism 95 is linked to the operating component 78. The reduction mechanism 95 reduces the speed of rotation of the shift motor 29 and transmits the reduced rotation speed to the operating component 78. The actuation position sensor 26, which is used to detect the actuation position currently occupied by the sleeve 77 of the internal gear shifter 10, is disposed inside the reduction mechanism 95.

A first one-way clutch 80 is provided between the inner peripheral surface of the hub shell 43 and the outer peripheral surface at the other end of the driver 42. A second one-way clutch 81 is provided between the inner peripheral surface of the hub shell 43 and the outer peripheral surface of the ring gear 64. These one-way clutches 80 and 81 are both roller-type one-way clutches, which reduces noise during idle running when a shift is made, softens the shock when a shift is made, and allows for smoother shifting.

With a structure such as this, a large speed-increasing power transmission path with the largest speed increasing ratio is created when the drive pawl 71 strikes a stopping protrusion 41a of the hub axle 41 and the first sun gear 60 is selected; a medium speed-increasing power transmission path with the second-largest speed increasing ratio is created when the second sun gear 61 is selected; and a small speed-increasing power transmission path with the smallest speed increasing ratio is created when the third sun gear 62 is selected. A direct-coupled power transmission path is created when none of the sun gears has been selected.

More specifically, when the first sun gear 60 is linked to the hub axle 41 by the shift motor 29, the bicycle is in fourth gear; the rotation of the driver 42 by the hub cog 47 is increased by the largest gear ratio determined by the number of teeth on the first sun gear 60, the first gear 63a and the second gear 63b of the planet gears 63, and the ring gear 64; and this rotation is transmitted to the hub shell 43 via the second one-way clutch 81. When the second sun gear 61 is selected and linked to the hub axle 41, the bicycle is in third gear; the rotation of the driver 42 is increased by a medium (the second largest) gear ratio determined by the number of teeth on the second sun gear 61, the second gear 63b of the planet gears 63, and the ring gear 64; and this rotation is transmitted to the hub shell 43 via the second one-way clutch 81. When the third sun gear 62 is selected and linked to the hub axle 41, the bicycle is in second gear; the rotation of the driver 42 is increased by the smallest gear ratio determined by the number of teeth on the third sun gear 62, the second gear 63b and the third gear 63c of the planet gears 63, and the ring gear 64; and this rotation is transmitted to the hub shell 43 via the second one-way clutch 81. When none of the sun gears 60 to 62 has been selected, the bicycle is in first gear, and the rotation of the driver 42 is transmitted directly to the hub shell 43 through the first one-way clutch 80.

In general, the sun gears that have not been selected perform relative rotation in the opposite direction from the forward direction with respect to the hub axle 41. When any one of the sun gears is selected and speed is stepped up by the planet gear mechanism 44, the driver 42 and the hub shell 43 perform relative rotation in the direction in which the meshing of the first one-way clutch 80 is released.

An antitheft device 85 is provided to the left end (in FIG. 5) of the hub axle 41 within the hub shell 43. As shown in FIGS. 7 through 10, the antitheft device 85 has a spring washer 101 that rotates integrally with the sleeve 77, a moving cam 102, a moving member 103, a moving spring 104, and a lock ring 114. The moving cam 102 is nonrotatably installed while allowed to move axially in relation to the hub axle 41. The moving member 103 presses against the moving cam 102. The moving spring 104 is disposed in a compressed state between the moving member 103 and a hub cone 52. The lock ring 114 is pressed against the moving member 103.

The spring washer 101 is a member that is nonrotatably stopped by the sleeve 77, and has around its outer periphery an engagement tab 105 that contacts the moving cam 102. The moving cam 102 has a cylindrical cam body 106 and a stopping washer 107 that stops the cam body 106 and the hub axle 41 such that they can move in the axial direction but cannot rotate. A cam component 108 that contacts the engagement tab 105 is formed at the right end (in FIG. 9) of the cam body 106. The cam component 108 is formed such that the cam body 106 is moved axially to the right by the rotation of the sleeve 77 toward the locked position.

Figure 10:
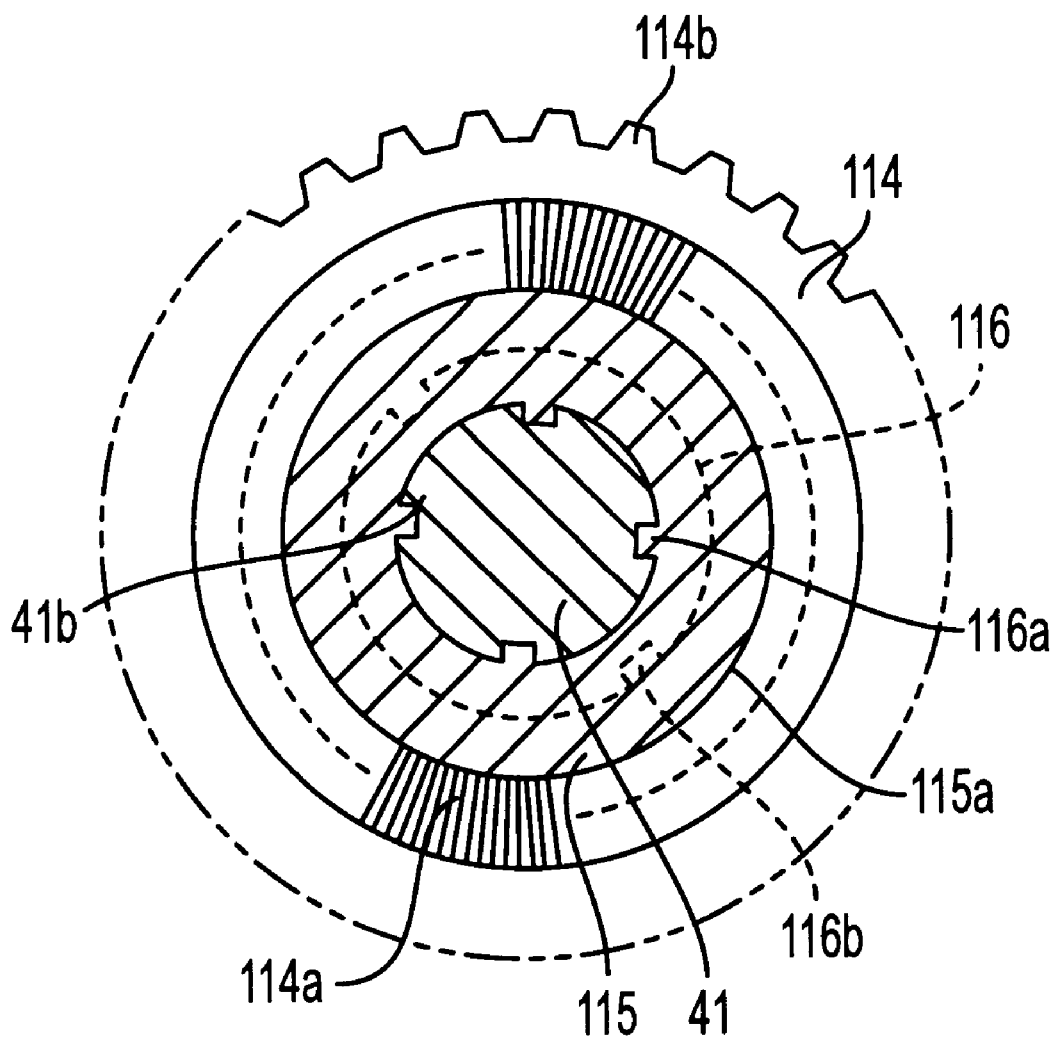
FIG. 10 is a front view of a lock ring used in the antitheft device shown in FIGS. 7 and 8.

The moving member 103 has a disk-shaped flange component 15 and a cylindrical component 116 integrally formed along the inner periphery of the flange component 15. A step 115a is formed on the flange component 115 in its midportion, as viewed in the radial direction. A lock ring 114 is rotatably supported by the step 115a. As shown in FIG. 10, respective radial irregularities 114a (only those located on the side of the lock ring 114 are shown) are formed on the surface of the lock ring 114 facing the flange component 115 and on the surface of the flange component 115 facing the lock ring 114. The presence of such irregularities 114a increases the frictional force between the lock ring 114 and the moving member 103 and causes these components to vibrate and to produce sound during relative rotation. Serration teeth 114b are formed in the outer peripheral portion of the lock ring 114. These serration teeth 114b can mesh with serration teeth 113, which are formed in the inner peripheral surface of the hub shell 43.

Figure 7:
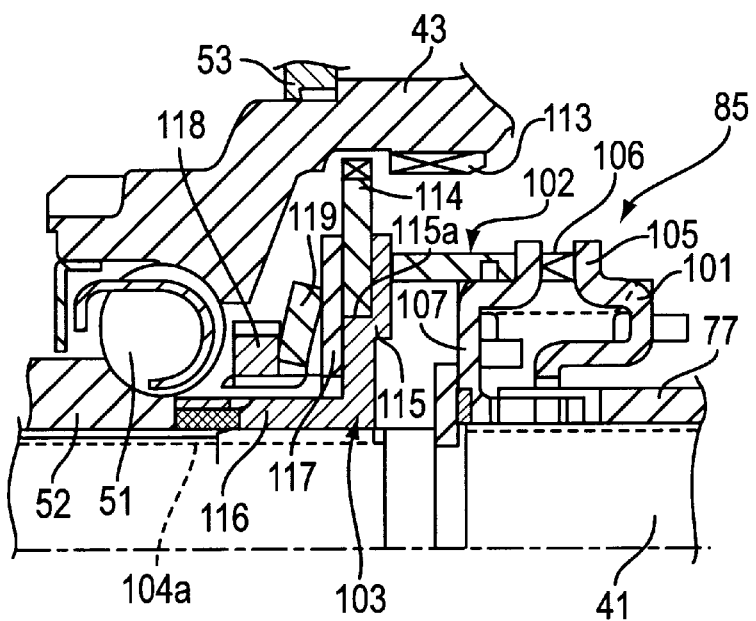
FIG. 7 is an enlarged cross sectional diagram of the antitheft device during normal riding.
Figure 8:
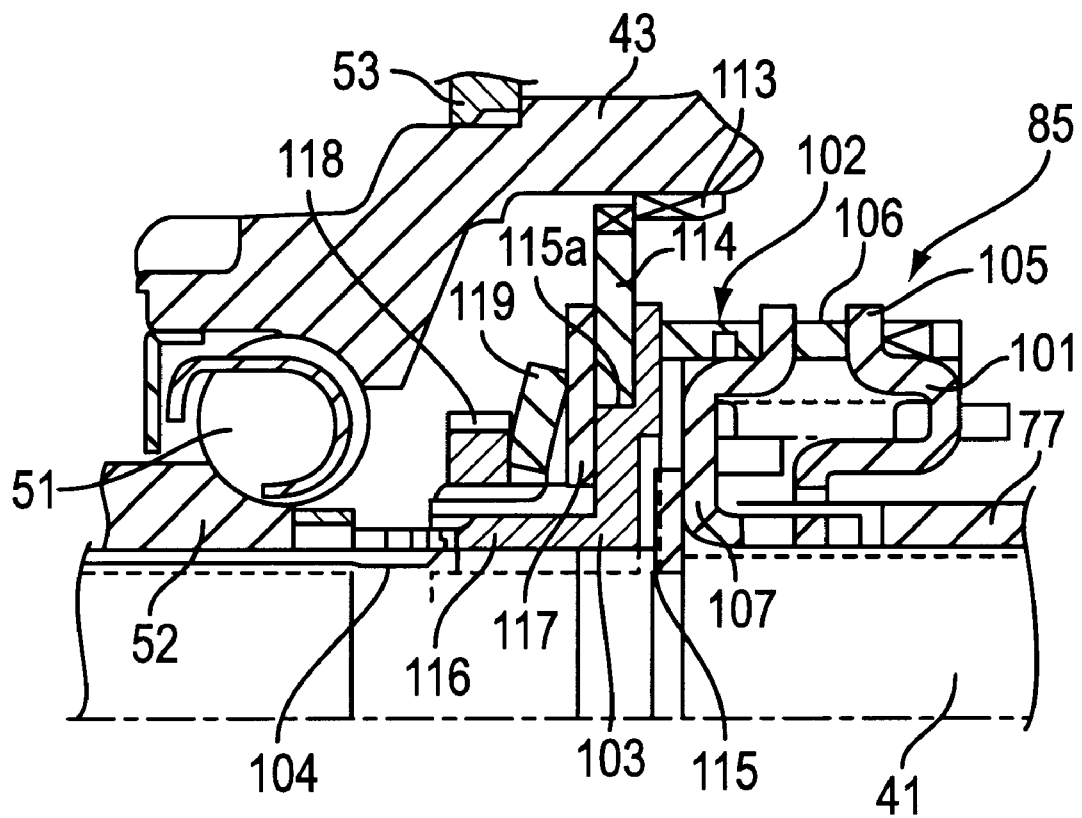
FIG. 8 is an enlarged cross sectional diagram of the antitheft device in a locked state.
Figure 9A:
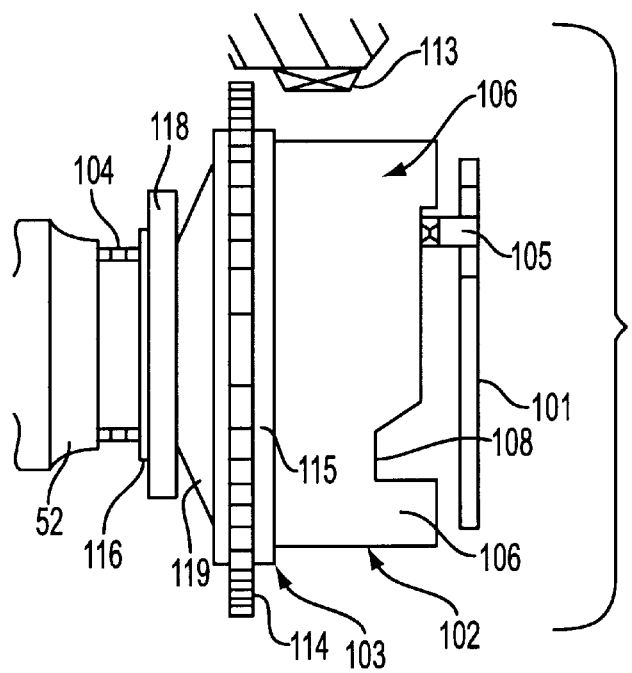
FIGS. 9A–9B are schematic views illustrating the operation of the antitheft device shown in FIGS. 7 and 8.
Figure 9B:
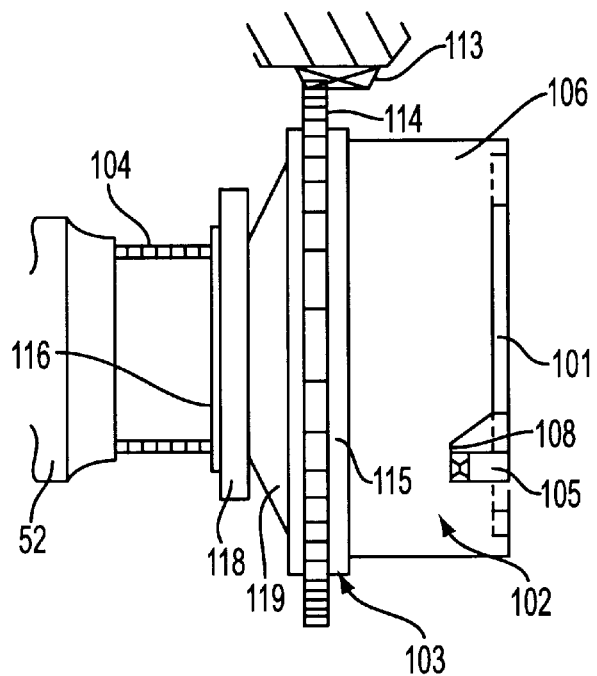

Four protrusions 116a are formed on the inner peripheral surface of the cylindrical component 116, as shown in FIG. 10. The protrusions 116a engage four grooves 41b formed in the outer peripheral surface of the hub axle 41. As a result of this arrangement, the moving member 103 is nonrotatably supported by the hub axle 41 while allowed to move in the axial direction. A thread and a stopping groove are formed in the outer peripheral surface of the cylindrical component 116. A pressure ring 117 is mounted around the outside of the cylindrical component 116, as shown in FIG. 7. The pressure ring 117, which is nonrotatably supported on the cylindrical component 116 while allowed to move in the axial direction, is allowed to come into contact with the lock ring 114. In addition, a pressure nut 118 is screwed on the outer periphery at the right end of the cylindrical component 116. A coned disk spring 119 is disposed between the pressure nut 118 and the pressure ring 117.

The pressure exerted by the coned disk spring 119 can be adjusted by adjusting the fastening of the pressure nut 118; the frictional force between the lock ring 114 and the flange component 115 of the moving member 103 can be adjusted via the pressure ring 117; and the rotation of the hub shell 43 can be controlled arbitrarily. For example, maximizing the frictional force produced by the coned disk spring 119 makes it possible to bring the system into a locked state with minimal rotation of the hub shell 43. Furthermore, reducing the frictional force weakens the force with which the rotation of the hub shell 43 is controlled and allows the hub shell 43 to rotate in relation to the hub axle 41. In this case as well, a frictional force is generated when the coned disk spring 119 is adjusted, and the rotation is controlled, unlike in a free-rotating state. This embodiment allows the rotation of the hub shell 43 (that is, the rotation of the rear wheel 7) to be freely controlled by adjusting the biasing force of the coned disk spring 119 within a range that extends essentially from a locked state to a free-rotating state.

Shifting and locking are performed by actuating the shift motor 29 through the control buttons 21 and 22 and through the magnetically operated antitheft control device described below. Each of these methods rotates the sleeve 77 via the operating component 78.

Figure 11:
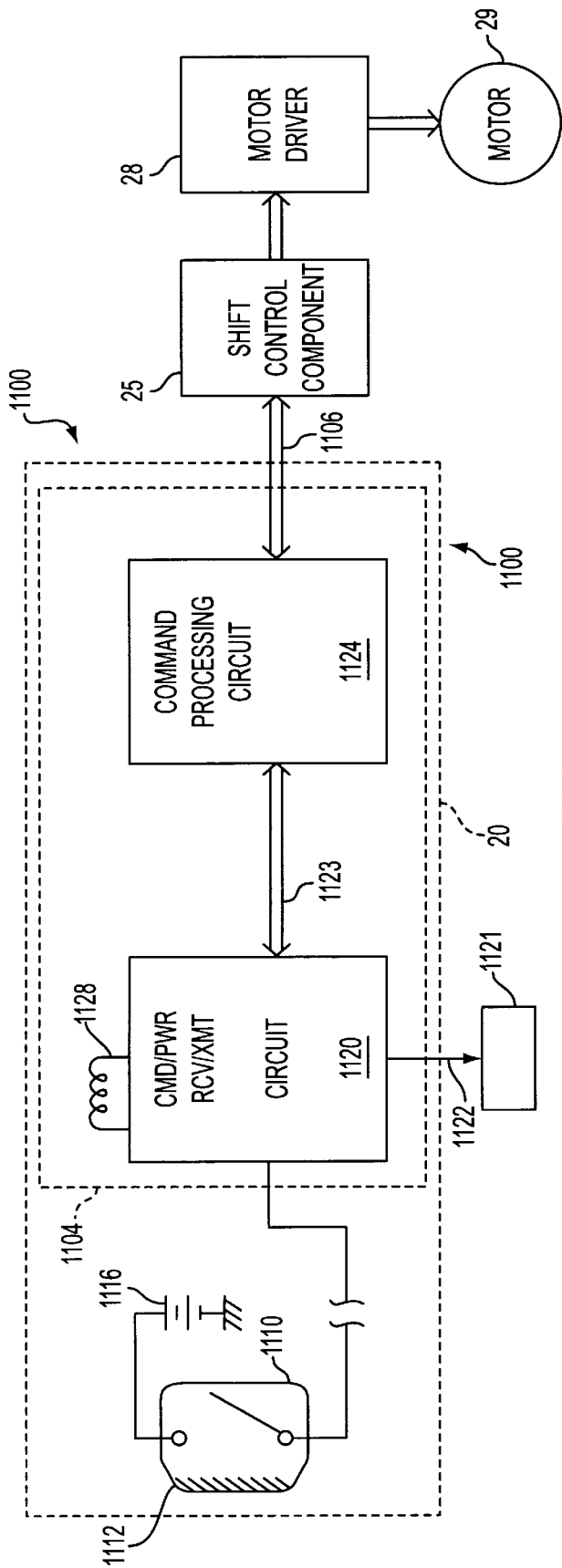
FIG. 11 is a schematic block diagram of a particular embodiment of the antitheft control device according to the present invention in an off state.

FIG. 11 is a more detailed block diagram of the relevant portions of an antitheft control circuit 1100 according to the present invention. The antitheft control circuit 1100 shown in FIG. 11 may be used to remotely lock or unlock hub 10. As shown in FIG. 11, antitheft control circuit 1100 includes a lock control circuit 1104 for providing lock control signals; a switch 1110 for selectively enabling the lock control circuit 1104 to provide the lock control signals; and a sensor 1112 for sensing an externally transmitted enabling signal. In this embodiment, sensor 1112 is a magnetic sensor for sensing magnetic signals, and switch 1110 is a normally open switch that closes and remains closed only as long as a magnetic signal is sensed by sensor 1112. More specifically, in this embodiment switch 1110 and sensor 1112 together comprise a reed switch which performs both functions. Switch 1110 is disposed between power supply 27 (which is shown as a battery 1116) and lock control circuit 1104 for selectively providing power to lock control circuit 1104. Thus, when switch 1110 is in the open or off state shown in FIG. 11, no power is provided to lock control circuit 1104, lock control circuit 1104 is in the unpowered or off state, and no lock control signals are provided by lock control circuit 1104.

Lock control circuit 1104 includes a command/power receiver/transmitter circuit 1120 and a command processing circuit 1124 for processing commands received by command/power receiver/transmitter circuit 1120 and for providing the lock control signals on communication path 1106 to shift control component 25. As noted above, shift control component 25 provides the appropriate signals to motor driver 28 for driving motor 29 which controls the operational states of hub 10 (including placing hub 10 in the locked and unlocked states).

In this embodiment, command/power receiver/transmitter circuit 1120 is constructed for receiving wireless command signals through a coil 1128 and also for providing power signals through coil 1128 to a key described below. For example, command/power receiver/transmitter circuit 1120 may be a model U2270B read/write base station sold by Temic Semiconductor. The detailed structure and operation of command/power receiver/transmitter circuit 1120 is shown in the U2270B Data Sheet published by Temic Semiconductor and incorporated herein by reference. Command/power receiver/transmitter circuit 1120 is coupled to an indicator light such as a taillight 1121 through a communication path 1122 for indicating when a lock/unlock command has been received, and command/power receiver/transmitter circuit 1120 is coupled to command processing circuit 1124 over a communication path 1123.

The command signals received by command/power receiver/transmitter circuit 1120 may include a lock command signal for locking the antitheft device and/or an unlock command signal for unlocking the antitheft device. Such signals may be separate signals bearing different information, or the lock command signal and the unlock command signal may be identical. In the latter case command processing circuit 1124 processes the incoming command based on the current state of the antitheft device. In other words, the incoming command is processed like a lock command signal when the antitheft device is in the unlocked state, and the incoming command is processed like an unlock command signal when the antitheft device is in the locked state. Similarly, the lock control signal provided by command processing circuit 1124 may include a lock signal for locking the antitheft device and/or an unlock signal for unlocking the antitheft device. Such signals may be separate signals bearing different information, or the lock signal and the unlock signal may be identical. The former case may be used when motor driver 28 is an unintelligent controller and merely provides drive signals to motor 29. In the latter case motor driver 28 is an intelligent circuit and processes the incoming lock control signal based on the current state of the antitheft device. In other words, the lock control signal is processed like a lock signal when the antitheft device is in the unlocked state, and the lock control signal is processed like an unlock signal when the antitheft device is in the locked state.

Figure 12:
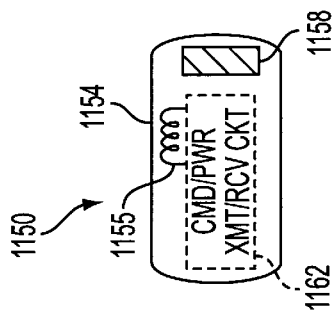
FIG. 12 is a diagram of a particular embodiment of a key used to remotely control the lock control circuit shown in FIG. 11.

FIG. 12 is a diagram of a wireless key 1150 used to remotely control lock control circuit 1104. As shown in FIG. 12, key 1150 includes a key base 1154, an enabling signal transmitter 1158 supported to key base 1154 for transmitting the enabling signal for enabling the bicycle antitheft control device, and a command/power transmitter/receiver circuit 1162 supported to key base 1154 for receiving the power signals transmitted by command/power receiver/transmitter circuit 1120 in lock control circuit 1104 and for transmitting the wireless commands. As noted above, the command signals may include a lock command signal for locking the antitheft device and/or an unlock command signal for unlocking the antitheft device. Such signals may be separate signals bearing different information, or the lock command signal and the unlock command signal may be identical. However, the codes generated by the command/power transmitter/receiver circuit of one key should be different from the codes transmitted by another key so that an arbitrary key cannot lock or unlock the antitheft device. In this embodiment, command/power transmitter/receiver circuit 1162 may comprise a model E5550 read/write identification integrated circuit sold by Temic Semiconductor which includes a coil 1155 for receiving the power signals from command/power receiver/transmitter circuit 1120 and for providing the commands to command/power receiver/transmitter circuit 1120. The detailed structure and operation of command/power transmitter/receiver circuit 1162 is shown in the E5550 Data Sheet published by Temic Semiconductor and incorporated herein by reference.

Figure 13:
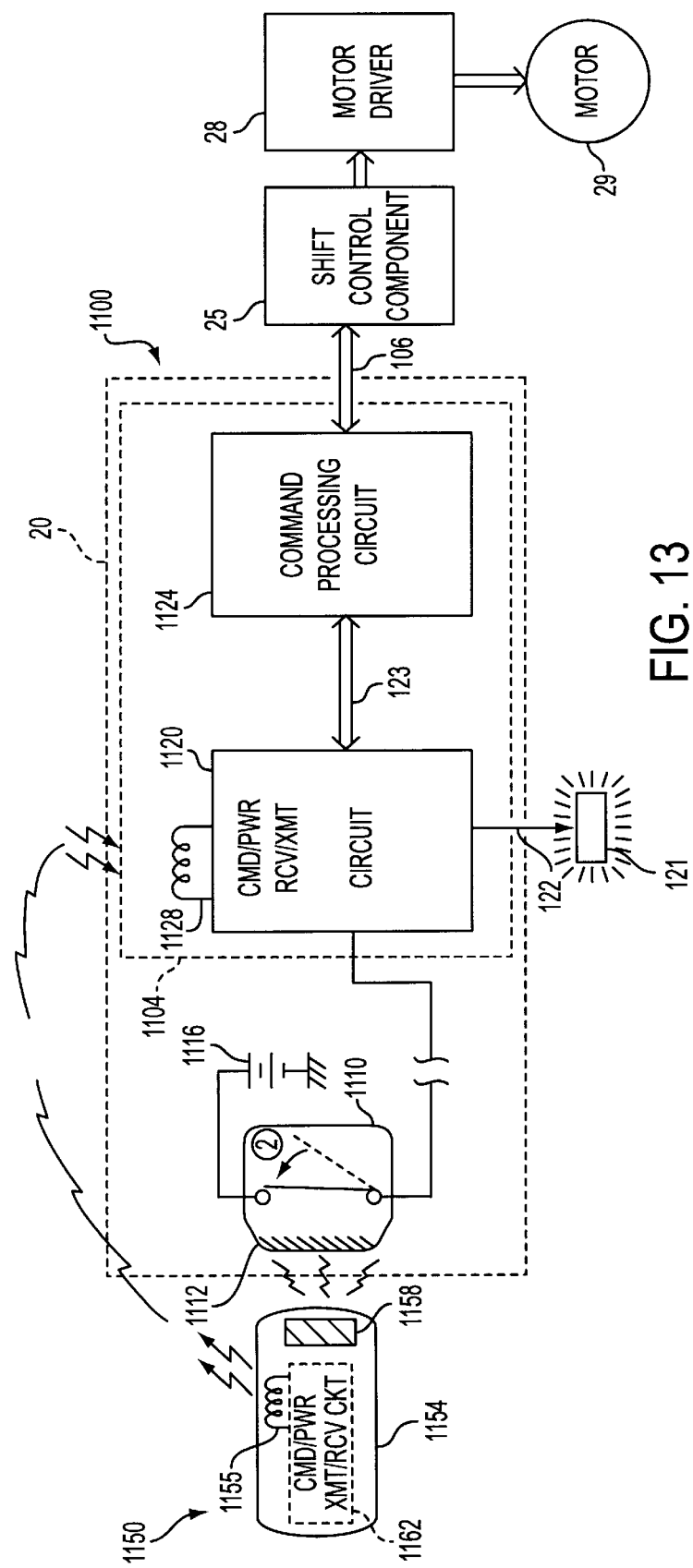
FIG. 13 is a schematic block diagram showing the operation of the antitheft control device.

FIG. 13 is a block diagram showing the operation of antitheft control device 1100. As noted above, switch 1110 is a normally open switch, so power from battery 1116 is not supplied to any of the antitheft control device operating components. As a result, antitheft control device 1100 normally is in a powered off state and battery 1116 is not discharged. To lock or unlock the antitheft device, key 1150 is placed in close proximity to sensor 1112. The magnetic enabling signal causes switch 1110 to close, thus providing power from battery 1116 to lock control circuit 1104. Once lock control circuit 1104 is powered up, command/power receiver/transmitter circuit 1120 generates power and data signals over coil 1128. The power signals are sensed by coil 1155 in key 1150 and used to power command/power transmitter/receiver 1162.

Once powered up, command/power transmitter/receiver 1162 processes the data signals transmitted by command/power receiver/transmitter circuit 1120 and transmits a lock/unlock command which may comprise a unique identification code programmed into command transmitter 1162. In other words, in this embodiment the lock/unlock command is a single signal which performs both the locking and unlocking command function.

The lock/unlock command then is received by command/power receiver/transmitter circuit 1120 through coil 1128, the receipt of the command is indicated by activating or flashing taillight 1121, and the command is communicated to command processing circuit 1124 over communication path 1123. Command processing circuit 1124 then determines whether to generate the lock and/or unlock signal (e.g., if the unique identification code received by command receiving circuit 1120 matches a previously stored identification code) and provides the appropriate signal to shift control component 25 which then provides signals to motor driver 28 over communication path 1106. Motor driver 28 then drives motor 29 for locking or unlocking hub 10.

More specifically, assuming the hub 10 is in the unlocked position, the sleeve 77 turns to the locked position through the agency of the operator 78. When the sleeve 77 turns from a shift position to the locked position, the engagement tab 105 of the spring washer 101 rotating together with the sleeve 77 moves inside the cam component 108. When the engagement tab 105 moves inside the cam component 108, the moving cam 102 and the moving member 103 energized by the moving spring 104 move to the right from the positions shown in FIGS. 7 and 9(A) to the positions shown in FIGS. 8 and 9(B). As a result of this, the serration teeth 114b of the lock ring 114 engage with the serration teeth 113 of the hub shell 43, and the rotation of the hub shell 43 is controlled by the force of friction between the lock ring 114 and the moving member 103. The corresponding frictional force can be changed as needed by adjusting the biasing force of the coned disk spring 119 through the tightening of the pressure nut 118. Therefore, pedaling fails to rotate the rear wheel 7 or such rotation is impaired.

The hub shell 43 is directly coupled with the hub axle 41 to achieve locking, and the rotation of the hub shell 43 (and rear wheel 7) is restricted when an attempt is made to push the bicycle, making such pushing more difficult to accomplish and reducing the likelihood of theft. An attempt to forcefully turn the hub shell 43 results in the relative rotation of the moving member 103 and the lock ring 114 and causes the lock ring 114 and the moving member 103 to vibrate and to emit a loud vibrating noise under the action of the irregularities 114a. Thus, loud noise is produced when the bicycle is pushed with a hand or the pedals are stepped on and the hub shell 43 is rotated in the locked state, making the bicycle more difficult to steal. The opposite occurs when hub 10 is in the locked position.

After the locking/unlocking operation is completed, key 1150 is removed from the proximity of sensor 1112, switch 1110 opens, power from battery 1116 is cut off from lock control circuit 1104, and lock control circuit 1104 resumes the powered off state.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. While switch 1110 in the described embodiment remained closed only as long as the magnetic enabling signal is received by sensor 1112, switch 1110 may operate for a certain time after the magnetic signal is removed. In that case the command signal need not be transmitted simultaneously with the enabling signal. While the command processing circuit 1124 was shown schematically separate from shift control component 25, the logic therein may be incorporated in shift control component 25. Indeed, in accordance with usual centralized or distributed processing techniques, the software and/or hardware may be combined or distributed as appropriate. Also, while the antitheft control device was incorporated into shift control element 9, antitheft control device 1100 may be a stand-alone system and operate independently of shift control element 9. If desired, the antitheft device may be incorporated into a shift control element 9 that has a manual locking mode such as shown in application Ser. No. 09/047,763 noted above.

Thus, the scope of the invention should not be limited by the specific structures disclosed. Instead, the true scope of the invention should be determined by the following claims.

What is claimed is:

1. An antitheft control apparatus for a bicycle comprising:
   a key including:
   a key base;
   an enabling signal transmitter supported to the key base for transmitting a wireless enabling signal;
   a power signal receiver for receiving an external wireless power signal; and
   a command signal transmitter supported to the key base for transmitting a wireless command signal, wherein the command signal transmitter is powered by the power signals received by the power signal receiver;
   an antitheft control circuit including:
   a lock control circuit for providing a lock control signal for at least one of locking and unlocking a bicycle antitheft device;
   a switch for selectively enabling the lock control circuit to provide the lock control signal;
   a sensor for sensing the wireless enabling signal transmitted by the key;
   wherein the switch is operatively coupled to the sensor for enabling the lock control circuit, in response to the enabling signal, to provide the lock control signal;
   wherein the lock control circuit includes:
   a power signal transmitter for transmitting the wireless power signal to the key; and
   a command receiving circuit for receiving the wireless command signal transmitted by the key for commanding the lock control circuit to provide the lock control signal.

2. The apparatus according to claim 1 wherein the sensor comprises a magnetic sensor.

3. The apparatus according to claim 1 wherein the switch is disposed between a power source and the lock control circuit for providing power from the power source to the lock control circuit in response to the enabling signal.

4. The apparatus according to claim 3 wherein the power source comprises a battery.

5. The apparatus according to claim 1 wherein the lock control signal comprises a lock signal for locking the bicycle antitheft device.

6. The apparatus according to claim 1 wherein the lock control signal comprises an unlock signal for unlocking the bicycle antitheft device.

7. The apparatus according to claim 1 wherein the lock control signal comprises:
   a lock signal for locking the bicycle antitheft device; and
   an unlock signal for unlocking the bicycle antitheft device.

8. The apparatus according to claim 7 wherein the lock signal and the unlock signal are formed together as a single lock/unlock signal.

9. The apparatus according to claim 1 wherein the power signal transmitter comprises a first coil, and wherein the power signal receiver includes a second coil.

10. The apparatus according to claim 1 wherein the command signal comprises a lock command signal for locking the bicycle antitheft device.

11. The apparatus according to claim 1 wherein the command signal comprises an unlock command signal for unlocking the bicycle antitheft device.

12. The apparatus according to claim 1 wherein the command signal comprises:
   a lock command signal for locking the bicycle antitheft device; and
   an unlock command signal for unlocking the bicycle antitheft device.

13. The apparatus according to claim 12 wherein the lock command signal and the unlock command signal are formed together as a single lock/unlock command signal.

14. The apparatus according to claim 1 wherein the lock control circuit provides the lock control signal when the command signal is received and the lock control circuit is enabled.

15. The apparatus according to claim 14 wherein the lock control circuit provides the lock control signal only when the command signal is received and the lock control circuit is enabled.

16. The apparatus according to claim 15 wherein the lock control circuit provides the lock control signal only when the command signal is received and the sensor is simultaneously receiving the enabling signal.

17. The apparatus according to claim 1 further comprising a motor, and wherein the lock control circuit includes a motor actuating circuit for actuating the motor in response to the lock control signal.

18. The apparatus according to claim 1 further comprising a light for flashing a visual signal in response to receiving the command signal.

19. The apparatus according to claim 1 wherein the switch and the sensor together comprise a reed switch.

20. A bicycle antitheft system comprising:
   a driver for receiving a driving force;

a hub shell rotatably supported on an axle;

a transmission disposed between the driver and the hub shell for communicating the driving force to the hub shell through a plurality of power transmission paths;

an antitheft device disposed between the driver and the hub shell for assuming an antitheft state for inhibiting rotation of the hub shell and a released state;

an actuator for placing the antitheft device in the antitheft state and the released state;

a motor for driving the actuator;

a motor driver for driving the motor in response to a lock control signal;

an antitheft control device comprising:
- a key including:
  - a key base;
  - an enabling signal transmitter supported to the key base for transmitting a wireless enabling signal;
  - a power signal receiver for receiving an external wireless power signal; and
  - a command signal transmitter supported to the key base for transmitting a wireless command signal, wherein the command signal transmitter is powered by the power signals received by the power signal receiver;
- an antitheft control circuit including:
  - a lock control circuit for providing a lock control signal for at least one of locking and unlocking a bicycle antitheft device;
  - a switch for selectively enabling the lock control circuit to provide the lock control signal;
  - a sensor for sensing the wireless enabling signal transmitted by the key;
  - wherein the switch is operatively coupled to the sensor for enabling the lock control circuit, in response to the enabling signal, to provide the lock control signal; p3 wherein the lock control circuit includes:
    - a power signal transmitter for transmitting the wireless power signal to the key; and
    - a command receiving circuit for receiving the wireless command signal transmitted by the key for commanding the lock control circuit to provide the lock control signal.

* * * * *